United States Patent
Su (10) Patent No.: US 8,203,812 B2
(45) Date of Patent: Jun. 19, 2012

(54) SECONDARY SIDE PROTECTION METHOD AND APPARATUS FOR A SWITCHING POWER CONVERTER

(75) Inventor: Wei-Chuan Su, Hsin-Chu (TW)

(73) Assignee: Grenergy Opto, Inc., Hsin-Chu (TW)

( * ) Notice: Subject to any disclaimer, the term of this patent is extended or adjusted under 35 U.S.C. 154(b) by 430 days.

(21) Appl. No.: 12/626,112

(22) Filed: Nov. 25, 2009

(65) Prior Publication Data

US 2011/0122535 A1    May 26, 2011

(51) Int. Cl.
*H02H 7/00* (2006.01)
*H02M 3/335* (2006.01)
(52) U.S. Cl. ....... 361/18; 363/17; 363/21.06; 363/21.14
(58) Field of Classification Search ............ 361/18; 363/17, 21.06, 21.14
See application file for complete search history.

(56) References Cited

U.S. PATENT DOCUMENTS

| | | | | |
|---|---|---|---|---|
| 5,206,800 A | * | 4/1993 | Smith | 363/21.14 |
| 5,768,118 A | * | 6/1998 | Faulk et al. | 363/72 |
| 6,618,274 B2 | * | 9/2003 | Boylan et al. | 363/17 |
| 6,836,414 B1 | * | 12/2004 | Batarseh et al. | 363/17 |
| 7,636,249 B2 | * | 12/2009 | Hu | 363/127 |
| 7,660,134 B2 | * | 2/2010 | Imai et al. | 363/17 |
| 2008/0278975 A1 | * | 11/2008 | Degen et al. | 363/21.18 |

* cited by examiner

*Primary Examiner* — Jared Fureman
*Assistant Examiner* — Scott Bauer
(74) *Attorney, Agent, or Firm* — Muncy, Geissler, Olds & Lowe, PLLC (57) ABSTRACT

The present invention discloses a secondary side protection method for a switching power converter, used to turn off a secondary side switch according to a secondary side voltage signal, wherein the secondary side voltage signal has falling edges corresponding to the start instants of secondary side discharge periods, and rising edges corresponding to the end instants of the secondary side discharge periods, the method comprising the steps of: measuring the time interval between two adjacent the rising edges repeatedly to derive discharge end cycle times; and generating a first turn-off signal to turn off the secondary side switch when the relative difference of two successive the discharge end cycle times exceeds a predetermined percentage. The present invention also provides a secondary side protection apparatus according to the method.

10 Claims, 12 Drawing Sheets

SECONDARY SIDE PROTECTION METHOD AND APPARATUS FOR A SWITCHING POWER CONVERTER

BACKGROUND OF THE INVENTION

1. Field of the Invention

The present invention relates to switching power conversions, and more particularly to switching power conversions capable of turning off a secondary side switch when abnormal load variations or light load status is detected.

2. Description of the Related Art

In supplying the power for electronic equipments, switching power converters are widely adopted due to the advantages of high conversion efficiency and small component size they possess.

Figure 1:
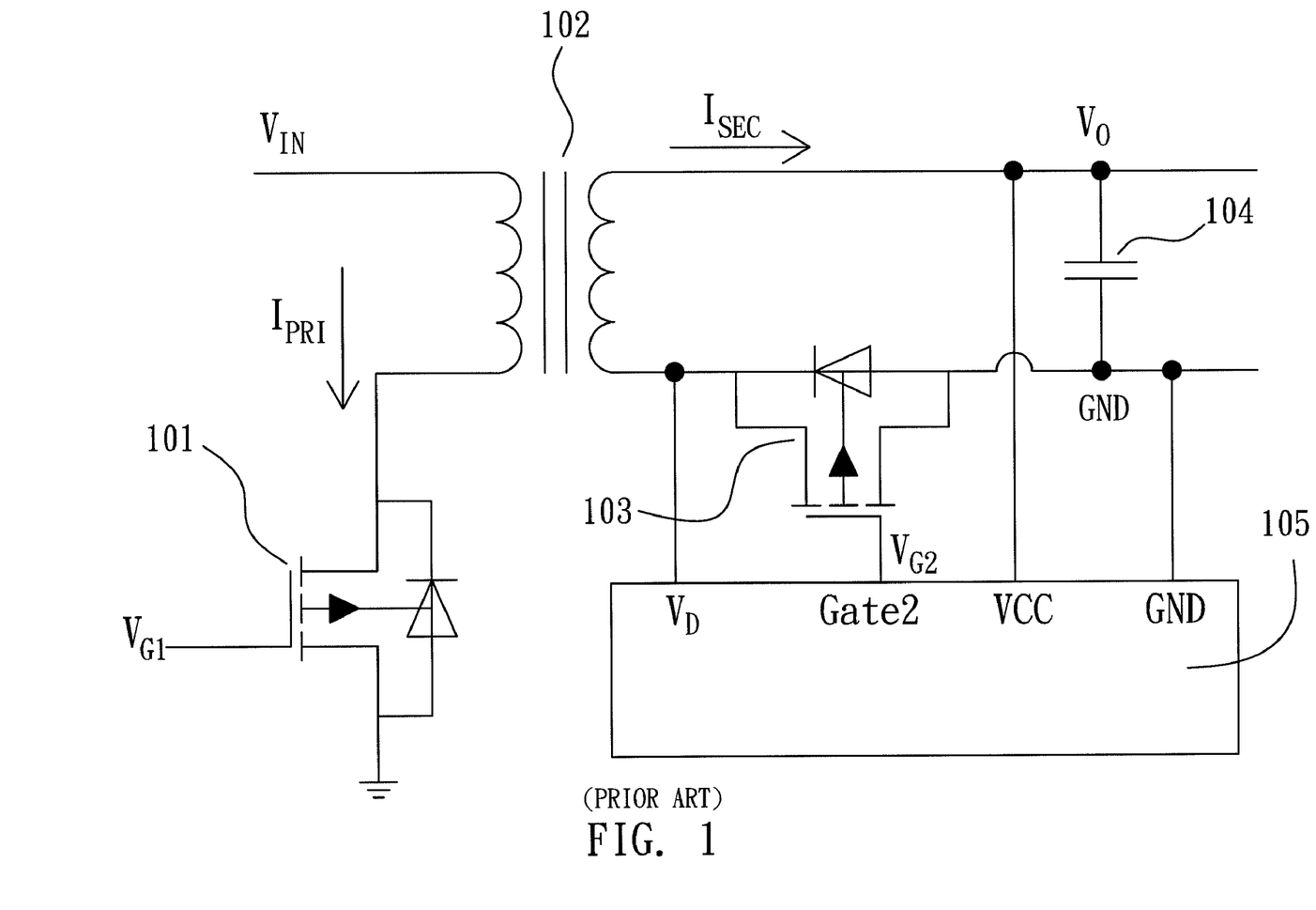
FIG. 1 is an illustrating block diagram of a prior art flyback AC-to-DC power adapter including a secondary side synchronous rectification controller.

Taking the flyback AC-to-DC power adapter as an example, FIG. 1 shows an illustrating block diagram of a prior art flyback AC-to-DC power adapter including a secondary side synchronous rectification controller. As shown in FIG. 1, the architecture includes a NMOS transistor 101, a main transformer 102, a NMOS transistor 103, a capacitor 104 and a secondary side synchronous rectification controller 105.

In the architecture, the NMOS transistor 101 is used to control the power transformation through the main transformer 102 in response to a PWM signal $V_{G1}$.

The main transformer 102 is used to transfer the input DC power source $V_{IN}$ to a DC output voltage $V_O$.

The NMOS transistor 103 is coupled to the secondary side of the main transformer 102 to emulate a rectification diode to cut off the current path at the secondary side when the NMOS transistor 101 is on and release the magnetic flux to the capacitor 104 and a load (not shown in FIG. 1) when the NMOS transistor 101 is off under the control of a secondary side gating signal $V_{G2}$ from the secondary side synchronous rectification controller 105.

The capacitor 104 is used for carrying the DC output voltage $V_O$.

The secondary side synchronous rectification controller 105 is used to generate the secondary side gating signal $V_{G2}$ to switch the NMOS transistor 103 according to a secondary side voltage signal $V_D$ which spikes high when the NMOS transistor 101 is turned on.

Through a periodic on-and-off switching of the NMOS transistor 101, which is driven by the PWM signal $V_{G1}$ generated from a PWM controller (not shown in FIG. 1), and a corresponding switching of the NMOS transistor 103, the input power is transformed through the main transformer 102 to the output.

However, when the DC output voltage $V_O$ experiences steep load transitions, the turn-on time of the NMOS transistor 101 controlled by the PWM signal $V_{G1}$ will exhibit large variations for a transient period, and the NMOS transistor 103 may thereby not be switched at the right instants during the transient period due to possible failure of the secondary side gating signal $V_{G2}$ to follow the dramatic variations of the turn-on time of the NMOS transistor 101, which will pose a risk of damaging the adapter. In addition, when the adapter is under a light load, the power dissipated in driving the NMOS transistor 103 may be more than that dissipated in a rectification diode of an adapter without a secondary side synchronous rectification controller.

Therefore, there is a need to provide a solution capable of switching off the secondary side switch appropriately when the adapter experiences steep load transitions or light load condition, to prevent possible disasters and/or minimize the power consumption.

SUMMARY OF THE INVENTION

One objective of the present invention is to provide a secondary side protection method for a switching power converter to appropriately switch off a secondary side switch when the adapter experiences steep load transitions or light load condition, to prevent possible disasters and/or minimize the power consumption.

Another objective of the present invention is to further provide a secondary side protection apparatus for a switching power converter to appropriately switch off a secondary side switch when the adapter experiences steep load transitions or light load condition, to prevent possible disasters and/or minimize the power consumption.

To achieve the foregoing objectives of the present invention, a secondary side protection method for a switching power converter is proposed to turn off a secondary side switch according to a secondary side voltage signal, wherein the secondary side voltage signal has falling edges corresponding to the start instants of secondary side discharge periods, and rising edges corresponding to the end instants of the secondary side discharge periods, the method comprising the steps of: measuring the time interval between two adjacent the rising edges repeatedly to derive discharge end cycle times; and generating a first turn-off signal to turn off the secondary side switch when the relative difference of two successive the discharge end cycle times exceeds a predetermined percentage.

To achieve the foregoing objectives, the present invention further provides a secondary side protection apparatus for a switching power converter to turn off a secondary side switch according to a secondary side voltage signal, wherein the secondary side voltage signal has falling edges corresponding to the start instants of secondary side discharge periods, and rising edges corresponding to the end instants of the secondary side discharge periods, the apparatus comprising: a cycle time measuring unit, used for measuring the time interval between two successive the rising edges repeatedly to derive discharge end cycle times; and a transient protection module, used for generating a first turn-off signal to turn off the secondary side switch when the relative difference of two successive the discharge end cycle times exceeds a predetermined percentage.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 2:
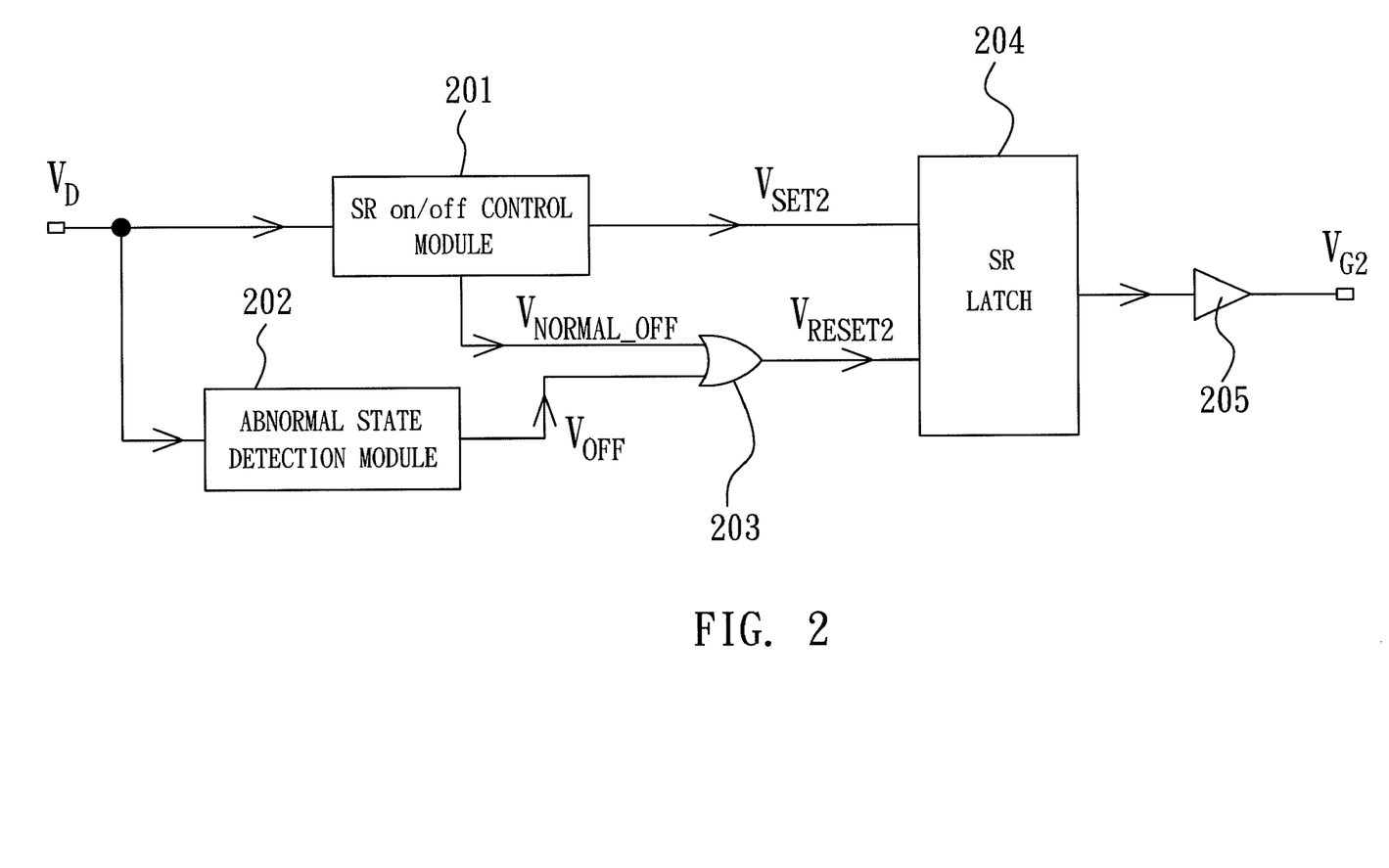
FIG. 2 is the block diagram of a secondary side synchronous rectification controller comprising a secondary side protection apparatus according to a preferred embodiment of the present invention.

Please refer to FIG. 2, which shows the block diagram of a secondary side synchronous rectification controller comprising a secondary side protection apparatus according to a preferred embodiment of the present invention. As shown in FIG. 2, the secondary side synchronous rectification controller includes a SR on/off Control Module 201, an Abnormal State Detection Module 202, an OR gate 203, a SR Latch 204 and a driver 205.

The SR on/off Control Module 201 is used to generate a turn-on signal $V_{SET2}$ and a normal turn-off signal $V_{NORMAL\_OFF}$ according to a secondary side voltage signal $V_D$ to periodically switch on/off a secondary side transistor, so that the secondary side discharge periods can be non-overlapping with the primary side charge periods, wherein the secondary side voltage signal $V_D$ has rising edges corresponding to the end instants of the secondary side discharge periods, and falling edges corresponding to the start instants of the secondary side discharge periods.

The Abnormal State Detection Module 202 is used to generate a compulsory turn-off signal $V_{OFF}$ to compulsorily switch off the secondary side transistor when the secondary side voltage signal $V_D$ is in an abnormal state corresponding to a steep load transition that the relative difference of two adjacent time intervals of the rising edges exceeds a predetermined percentage, or a light load condition that the time interval between the rising edge and the falling edge exceeds a predetermined period.

The OR gate 203 has two inputs coupled to the normal turn-off signal $V_{NORMAL\_OFF}$ and the compulsory turn-off signal $V_{OFF}$ respectively, and an output for generating a turn-off signal $V_{RESET2}$ which will be at high logic level when either of the two inputs is at high logic level.

The SR Latch 204 and the driver 205 are used to generate a secondary side gating signal $V_{G2}$ according to the turn-on signal $V_{SET2}$ and the turn-off signal $V_{RESET2}$, wherein the secondary side gating signal $V_{G2}$ will be at low logic level when the turn-off signal $V_{RESET2}$ is at high logic level.

Figure 3:
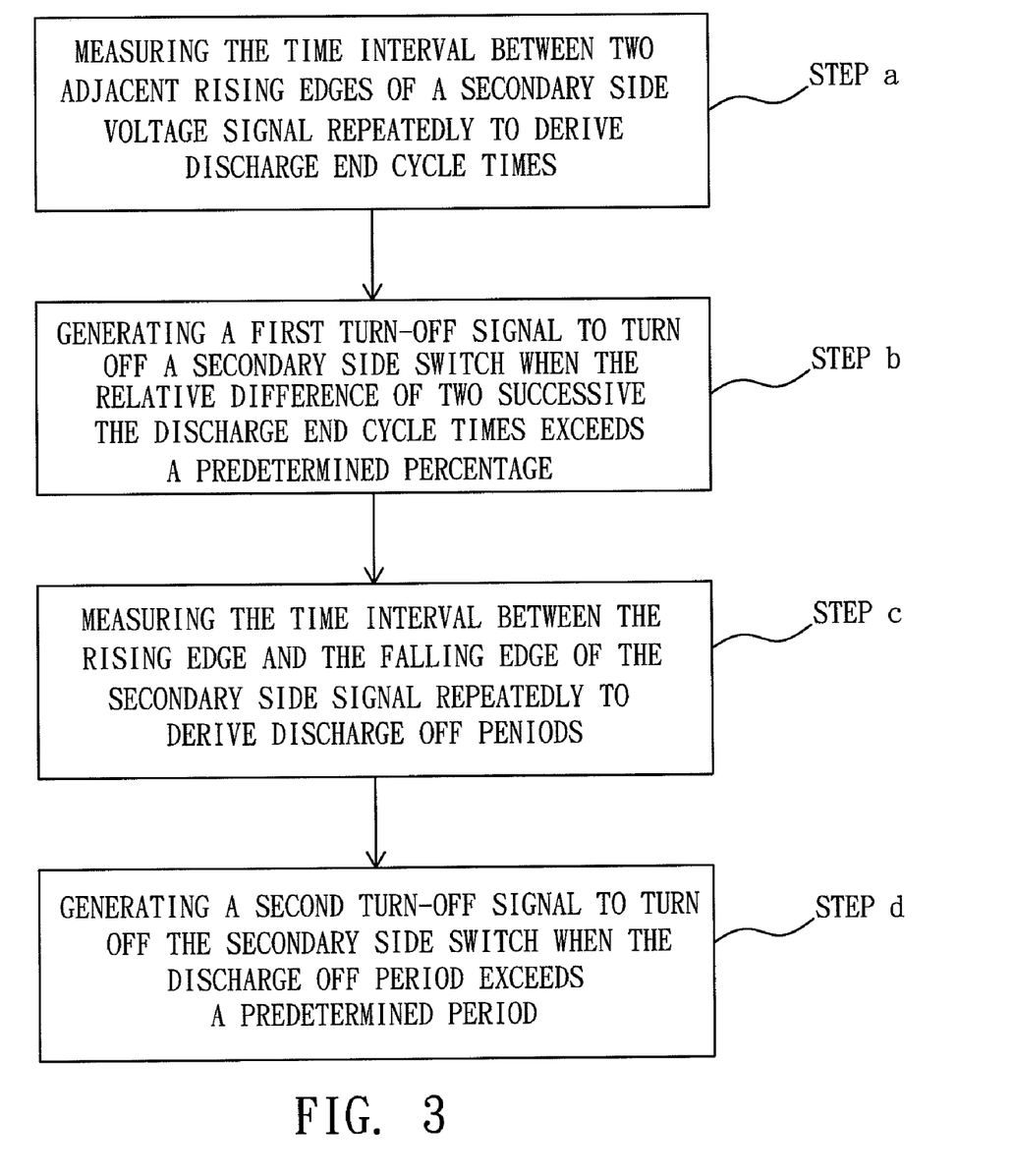
FIG. 3 is the flow chart of a secondary side protection method according to a preferred embodiment of the present invention.

According to the secondary side synchronous rectification controller in FIG. 2, a secondary side protection method is proposed. Please refer to FIG. 3, which shows the flow chart of a secondary side protection method according to a preferred embodiment of the present invention. As shown in FIG. 3, the method includes the steps of: measuring the time interval between two adjacent rising edges of a secondary side voltage signal repeatedly to derive discharge end cycle times (step a); generating a first turn-off signal to turn off a secondary side switch when the relative difference of two successive the charge end cycle times exceeds a predetermined percentage (step b); measuring the time interval between the rising edge and the falling edge of the secondary side voltage signal repeatedly to derive discharge off periods (step c); and generating a second turn-off signal to turn off the secondary side switch when the discharge off period exceeds a predetermined period (step d).

In step a, the rising edges of the secondary side voltage signal represent the end instants of the secondary side discharge periods.

In step b, the predetermined percentage is for example but not limited to 5%.

In step c, the lighter the load is, the longer the discharge off period will be.

In step d, the predetermined period can be for example but not limited to 50% of the discharge end cycle time corresponding to previous two adjacent rising edges.

Figure 4:
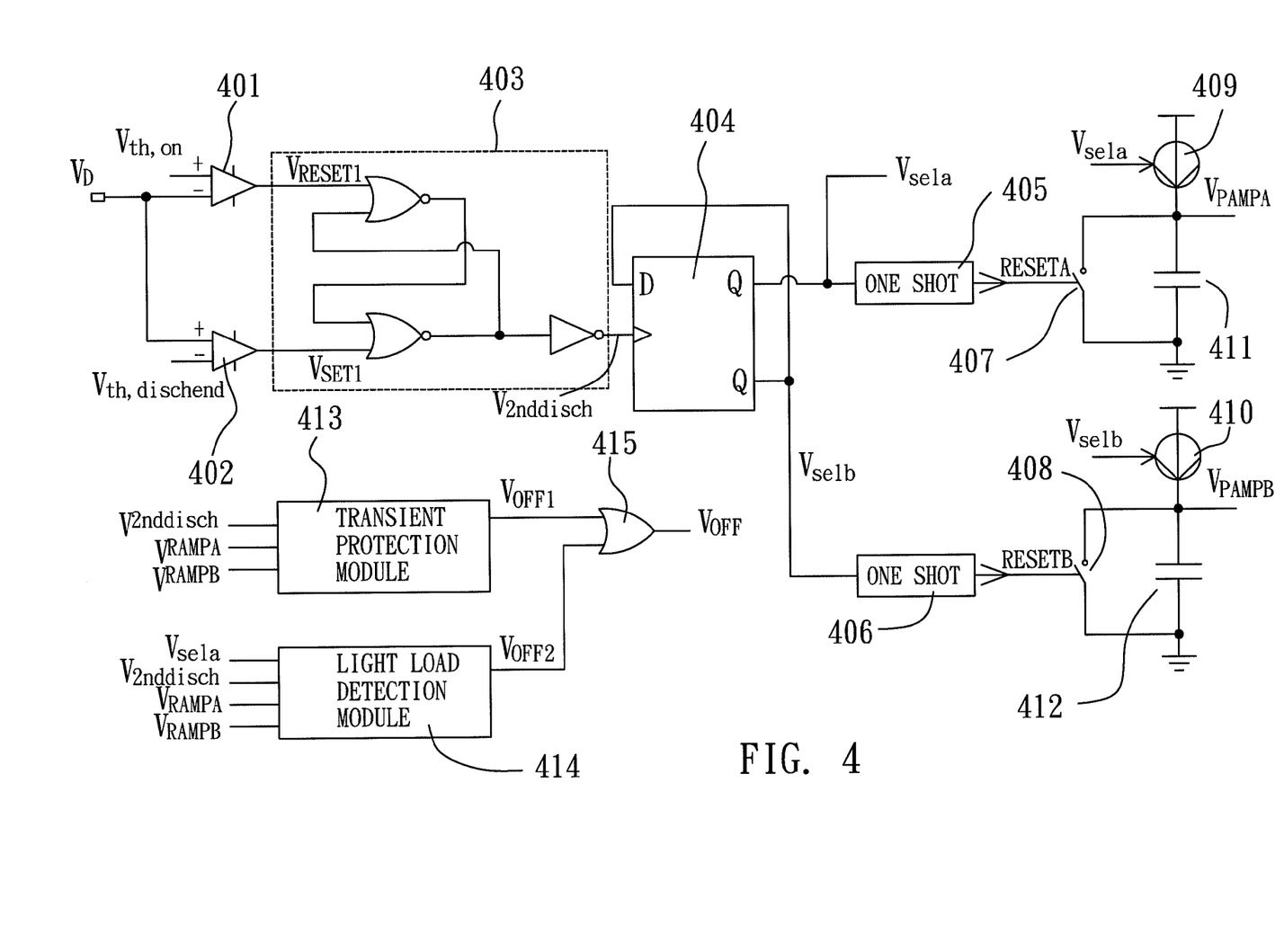
FIG. 4 is the block diagram of a secondary side protection apparatus according to a preferred embodiment of the present invention.

The Abnormal State Detection Module 202 in FIG. 2 can be implemented as in FIG. 4. Please refer to FIG. 4, which shows the block diagram of a secondary side protection apparatus according to a preferred embodiment of the present invention. As shown in FIG. 4, the apparatus includes a pair of comparators 401~402, a latch 403, a toggling unit 404, a pair of one-shot units 405~406, a pair of switches 407~408, a pair of current sources 409~410, a pair of capacitors 411~412, a transient protection module 413, a light load detection module 414 and an OR gate 415.

The comparator 401 is used to generate a first reset signal $V_{RESET1}$ according to a secondary side voltage signal $V_D$ and a first reference voltage $V_{th,on}$, and the comparator 402 is used to generate a first set signal $V_{SET1}$ according to the secondary side voltage signal $V_D$ and a second reference voltage $V_{th,dischend}$, wherein $V_{th,dischend}$ is greater than $V_{th,on}$.

The latch 403 is used to generate a secondary side discharge status signal $V_{2nddisch}$ according to the first reset signal $V_{RESET1}$ and the first set signal $V_{SET1}$, wherein the secondary side discharge status signal $V_{2nddisch}$ is a pulse signal of which the rising edges represent the end instants of the secondary side discharge periods and the falling edges represent the start instants of the secondary side discharge periods.

The toggling unit 404 is used to generate a first select signal $V_{sela}$ and a second select signal $V_{selb}$ according to the $V_{2nddisch}$, wherein the pulses of $V_{sela}$ are interleaved with the pulses of $V_{selb}$.

The one-shot unit 405 is used to generate a first discharging pulse RESETA according to $V_{sela}$, and the one-shot unit 406 is used to generate a second discharging pulse RESETB according to $V_{selb}$.

The switch 407 is used to discharge the capacitor 411 in response to RESETA, and the switch 408 is used to discharge the capacitor 412 in response to RESETB.

The current source 409 and the capacitor 411 are used to generate a first ramp signal $V_{RAMPA}$ under the control of $V_{sela}$, and the current source 410 and the capacitor 412 are used to generate a second ramp signal $V_{RAMPB}$ under the control of $V_{selb}$, wherein $V_{RAMPA}$ and $V_{RAMPB}$ both have a basic symbol consisted of a ramp-up portion and a hold portion, and when $V_{RAMPA}$ exhibits the ramp-up portion, $V_{RAMPB}$ is then exhibiting the hold portion, and vice versa. The voltages of $V_{RAMPA}$ and $V_{RAMPB}$ in the hold portions represent the secondary side discharge end cycle times.

The transient protection module 413 is used for generating a first turn-off signal $V_{OFF1}$ according to $V_{RAMPA}$ and $V_{RAMPB}$ at the rising edges of $V_{2nddisch}$ to turn off the secondary side transistor when the relative difference of two successive the secondary side discharge end cycle times, which are represented by the voltages of $V_{RAMPA}$ and $V_{RAMPB}$ in the hold portions, exceeds a predetermined percentage. The predetermined percentage can be for example but not limited to 5%.

The light load detection module 414 is used for measuring the time interval between the rising edge and the falling edge of $V_{2nddisch}$ repeatedly to derive discharge off periods by getting sample voltages of $V_{RAMPA}$ or $V_{RAMPB}$ in the ramp-up portions, which are determined by $V_{sela}$ at the falling edges of $V_{2nddisch}$; and generating a second turn-off signal $V_{OFF2}$ to turn off the secondary side transistor at the falling edges of $V_{2nddisch}$ when the sample voltage, which represents the discharge off period, exceeds a predetermined threshold voltage, which represents a predetermined period. The predetermined period can be for example but not limited to 50% of the discharge end cycle time corresponding to previous two adjacent rising edges of $V_{2nddisch}$.

The OR gate 415 has two inputs coupled to the first turn-off signal $V_{OFF1}$ and the second turn-off signal $V_{OFF2}$ respectively, and an output for generating the compulsory turn-off signal $V_{OFF}$ which will be at high logic level when either of the two inputs is at high logic level.

Figure 5A:
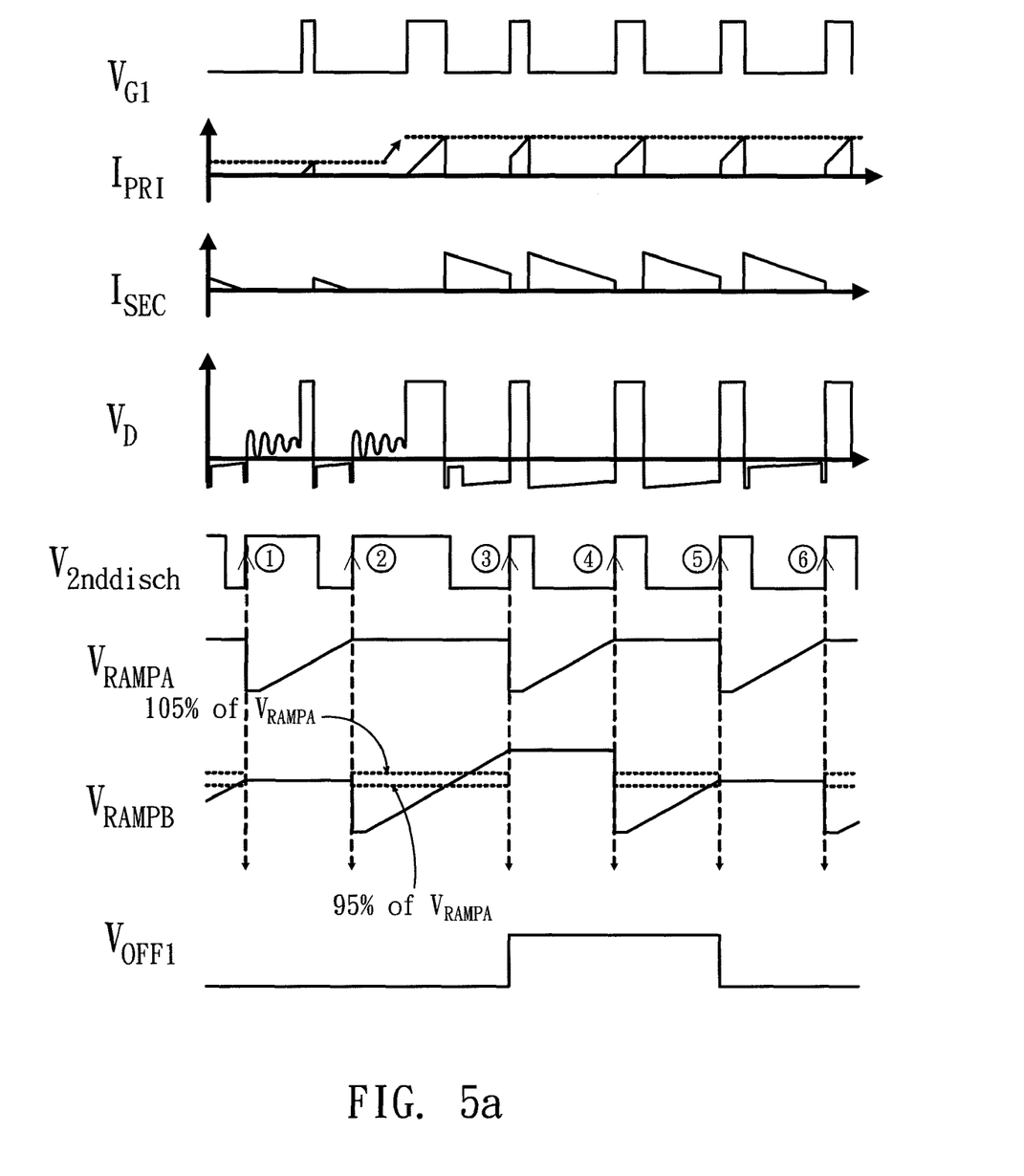
FIG. 5a is the waveforms diagram illustrating the operation of the apparatus in FIG. 4 during a DCM to CCM transition.

Please refer to FIG. 5a, which shows the waveforms diagram illustrating the operation of the apparatus in FIG. 4 during a DCM (Discontinuous Current Mode) to CCM (Continuous Current Mode) transition. As shown in FIG. 5a, $V_{RAMPB}$ is higher than 105% of $V_{RAMPA}$ at the third rising edge of $V_{2nddisch}$, so $V_{OFF1}$ changes state from low logic level to high logic level; and $V_{RAMPB}$ is between 95% and 105% of $V_{RAMPA}$ at the fifth rising edge of $V_{2nddisch}$, so $V_{OFF1}$ changes state from high logic level to low logic level.

Figure 5B:
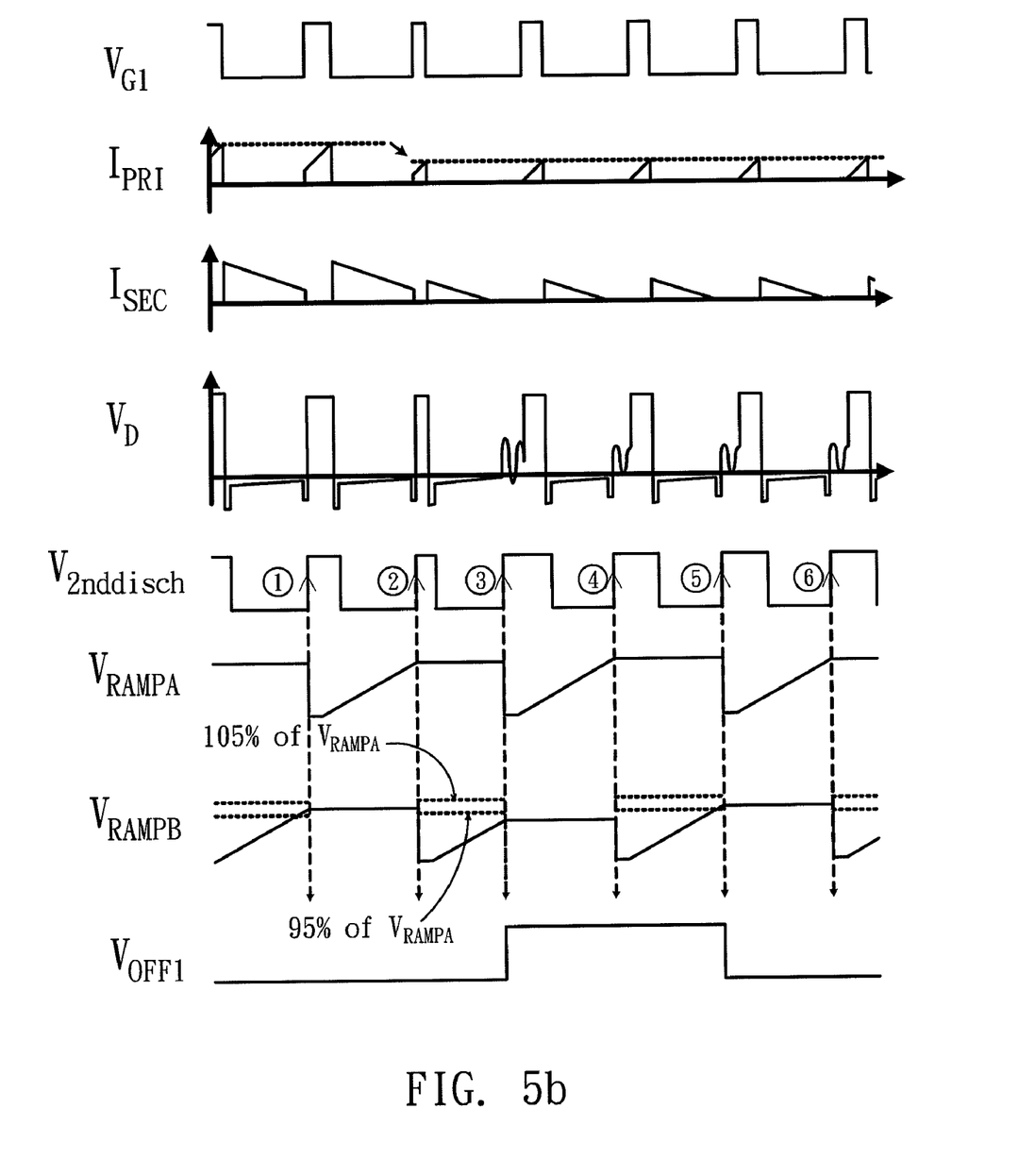
FIG. 5b is the waveforms diagram illustrating the operation of the apparatus in FIG. 4 during a CCM to DCM transition.

Please refer to FIG. 5b, which shows the waveforms diagram illustrating the operation of the apparatus in FIG. 4 during a CCM to DCM transition. As shown in FIG. 5b, $V_{RAMPB}$ is lower than 95% of $V_{RAMPA}$ at the third rising edge of $V_{2nddisch}$, so $V_{OFF1}$ changes state from low logic level to high logic level; and $V_{RAMPB}$ is between 95% and 105% of $V_{RAMPA}$ at the fifth rising edge of $V_{2nddisch}$, so $V_{OFF1}$ changes state from high logic level to low logic level.

Figure 5C:
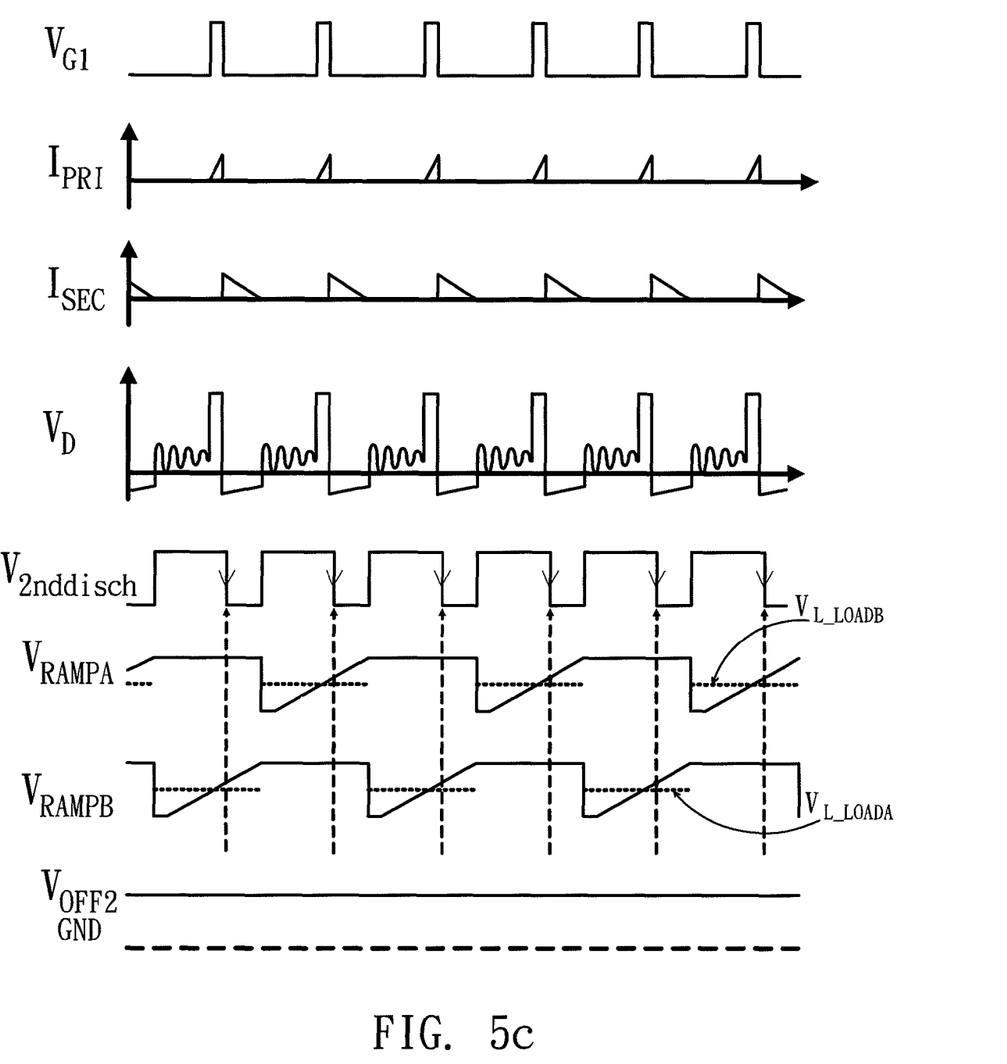
FIG. 5c is the waveforms diagram illustrating the operation of the apparatus in FIG. 4 when a light load status is detected.

Please refer to FIG. 5c, which shows the waveforms diagram illustrating the operation of the apparatus in FIG. 4 when a light load status is detected. As shown in FIG. 5c, $V_{RAMPB}$ is higher than a reference voltage $V_{L\_LOADA}$ and $V_{RAMPA}$ is higher than a reference voltage $V_{L\_LOADB}$ at the falling edges of $V_{2nddisch}$, so $V_{OFF2}$ remains at high logic level in the light load period.

Figure 6:
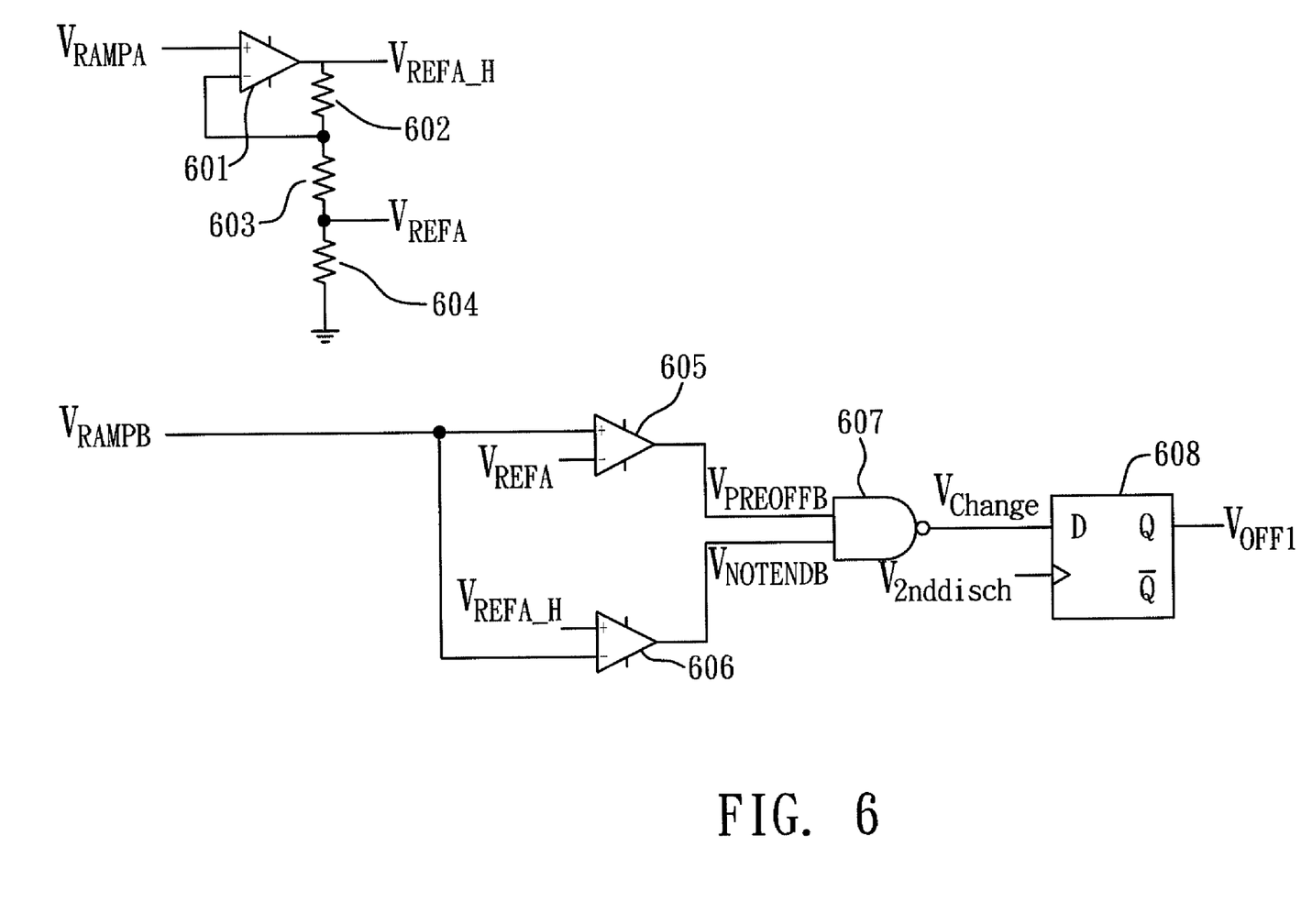
FIG. 6 is the circuit diagram of a transient protection module according to a preferred embodiment of the present invention.

The transient protection module 413 can be implemented with the circuit in FIG. 6 according to a preferred embodiment of the present invention. As shown in FIG. 6, the circuit includes an amplifier 601, resistors 602~604, a pair of comparators 605~606, a NAND gate 607 and a latch 608.

The amplifier 601 and the resistors 602~604 are used to generate a first threshold voltage $V_{REFA}$ which is 95% of $V_{RAMPA}$, and a second threshold voltage $V_{REFA\_H}$ which is 105% of $V_{RAMPA}$.

The comparator 605 has a positive input coupled to $V_{RAMPB}$, a negative input coupled to $V_{REFA}$, and an output for providing an under-low-bound signal $V_{PREOFFB}$, which will be at low logic level when $V_{RAMPB}$ is lower than $V_{REFA}$, and be at high logic level otherwise.

The comparator 606 has a negative input coupled to $V_{RAMPB}$, a positive input coupled to $V_{REFA\_H}$, and an output for providing an over-high-bound signal $V_{NOTENDB}$, which will be at low logic level when $V_{RAMPB}$ is higher than $V_{REFA\_H}$, and be at high logic level otherwise.

The NAND gate 607 has two inputs coupled to $V_{PREOFFB}$ and $V_{NOTENDB}$ respectively, and an output for generating an out-of-bound signal $V_{Change}$ which will be at high logic level when either of the two inputs is at low logic level, that is, when $V_{RAMPB}$ is lower than 95% of $V_{RAMPA}$ or higher than 105% of $V_{RAMPA}$, $V_{Change}$ will be at high logic level.

The latch 608 has a data input coupled to $V_{Change}$, a clock input coupled to $V_{2nddisch}$, and a state output for providing the first turn-off signal $V_{OFF1}$. The first turn-off signal $V_{OFF1}$ will take on the logic value of $V_{Change}$ at the rising edge of $V_{2nddisch}$, and when $V_{OFF1}$ exhibits high logic level, it means that the relative difference of two previous secondary side discharge end cycle times exceeds the predetermined percentage of 5%.

Figure 7A:
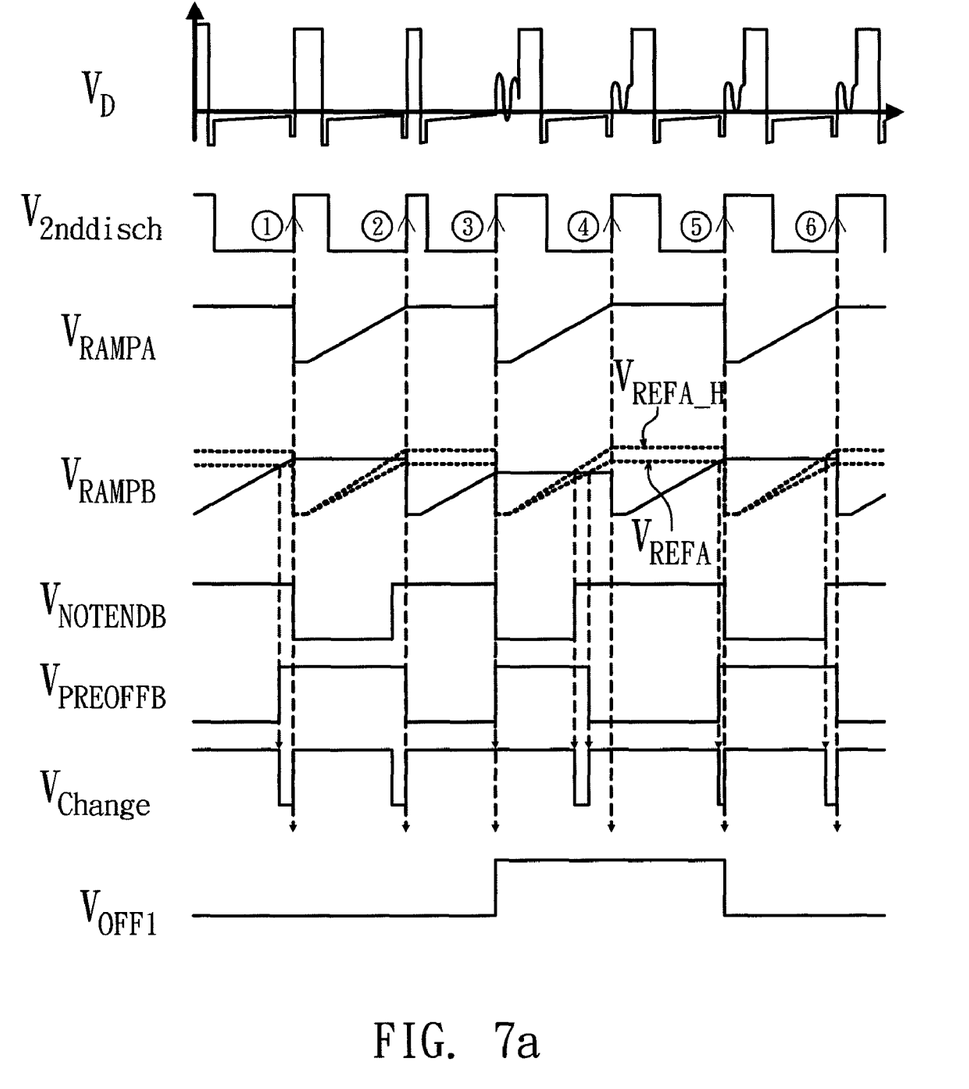
FIG. 7a is the waveforms diagram illustrating the operation of the circuit in FIG. 6 during a CCM to DCM transition.

Please refer to FIG. 7a, which shows the waveforms diagram illustrating the operation of the circuit in FIG. 6 during a CCM to DCM transition. As shown in FIG. 7a, $V_{RAMPB}$ is lower than $V_{REFA}$ at the third rising edge of $V_{2nddisch}$, so $V_{PREOFFB}$ is at low logic level, $V_{Change}$ is at high logic level and $V_{OFF1}$ changes state from low logic level to high logic level; and $V_{RAMPB}$ is between $V_{REFA}$ and $V_{REFA\_H}$ at the fifth rising edge of $V_{2nddisch}$, so both $V_{PREOFFB}$ and $V_{NOTENDB}$ are at high logic level, $V_{Change}$ is at low logic level and $V_{OFF1}$ changes state from high logic level to low logic level.

Figure 7B:
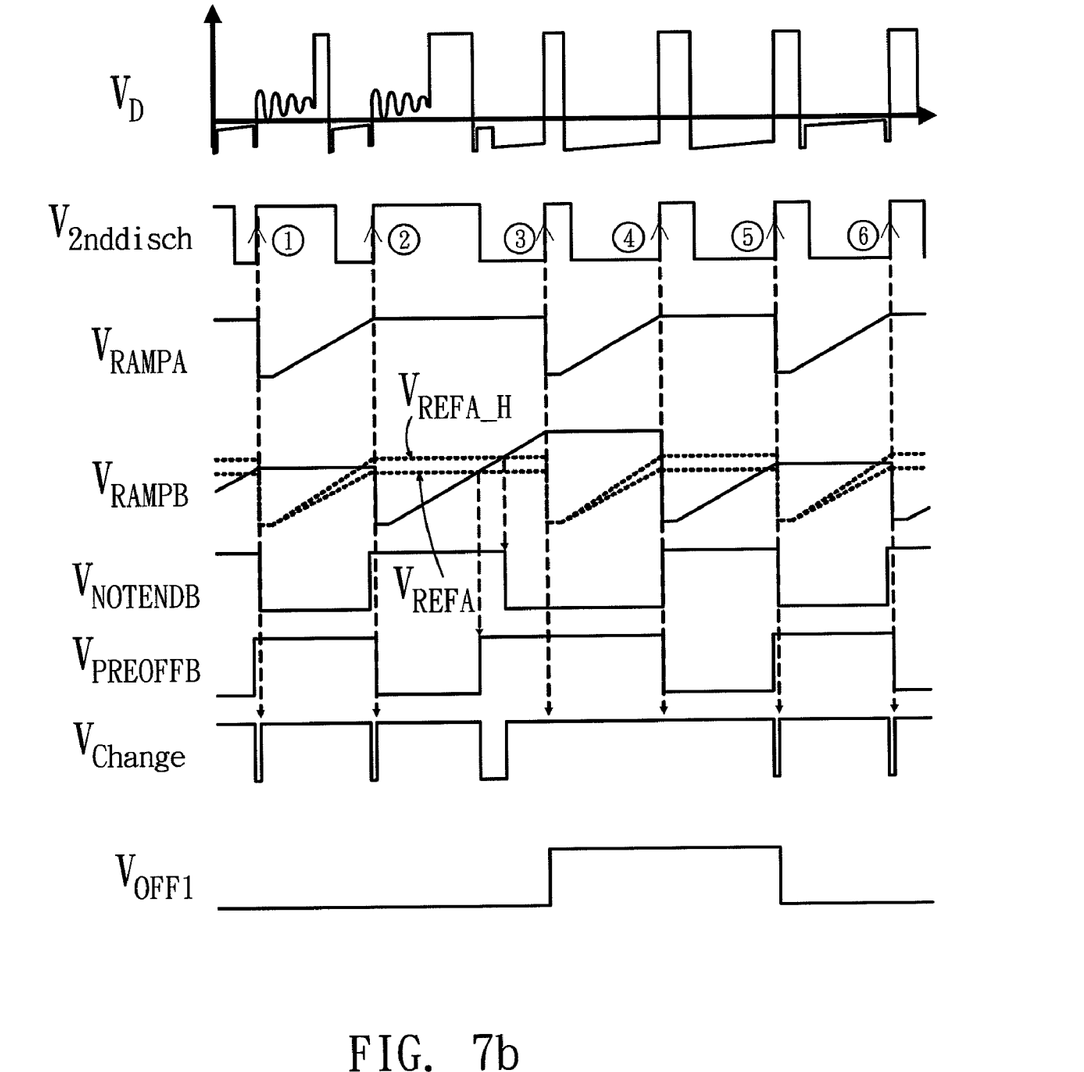
FIG. 7b is the waveforms diagram illustrating the operation of the circuit in FIG. 6 during a DCM to CCM transition.

Please refer to FIG. 7b, which shows the waveforms diagram illustrating the operation of the circuit in FIG. 6 during a DCM to CCM transition. As shown in FIG. 7b, $V_{RAMPB}$ is higher than $V_{REFA\_H}$ at the third rising edge of $V_{2nddisch}$, so $V_{NOTENDB}$ is at low logic level, $V_{Change}$ is at high logic level and $V_{OFF1}$ changes state from low logic level to high logic level; and $V_{RAMPB}$ is between $V_{REFA}$ and $V_{REFA\_H}$ at the fifth rising edge of $V_{2nddisch}$, so both $V_{PREOFFB}$ and $V_{NOTENDB}$ are at high logic level, $V_{Change}$ is at low logic level and $V_{OFF1}$ changes state from high logic level to low logic level.

Figure 8:
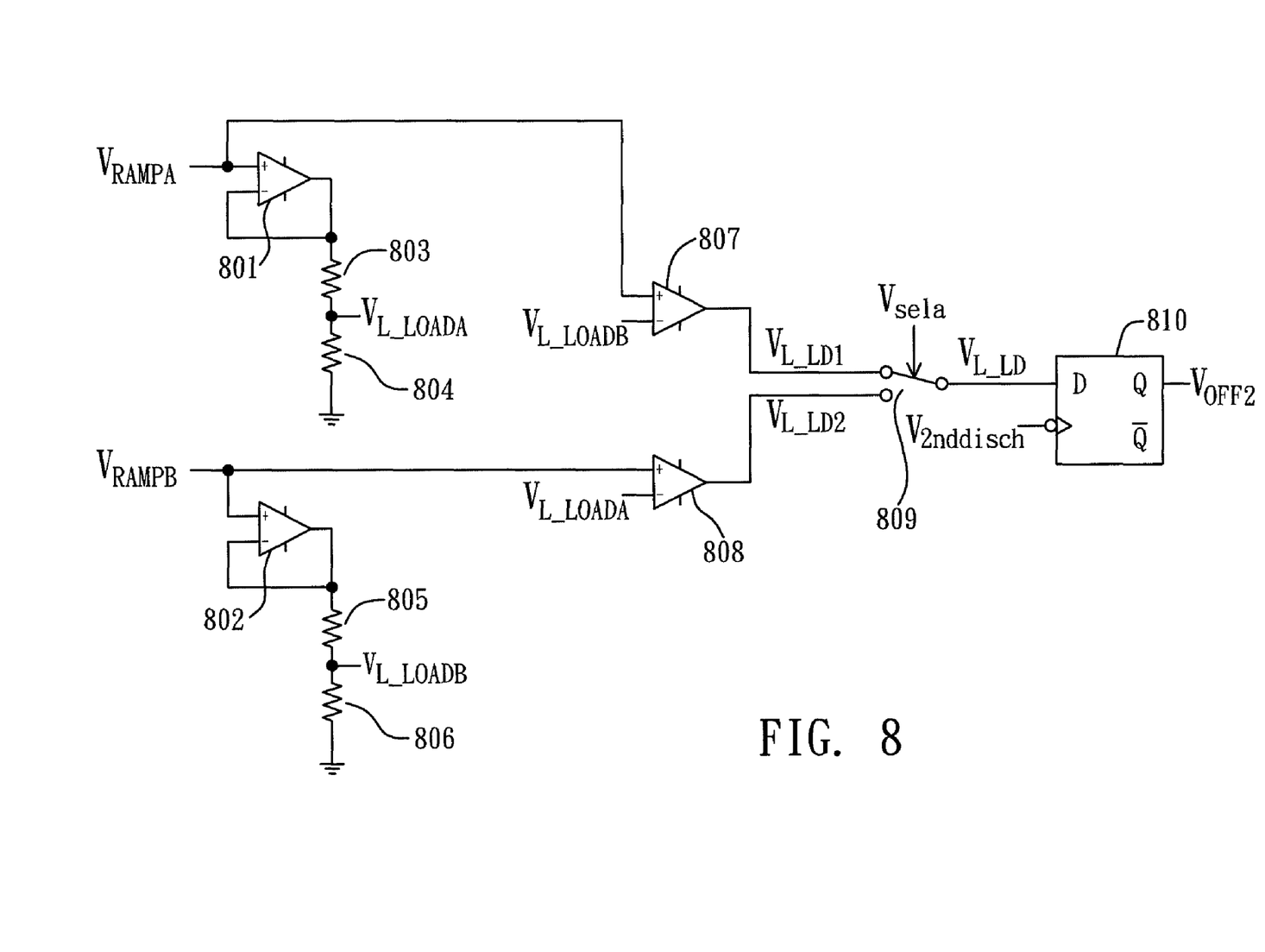
FIG. 8 is the circuit diagram of a light load detection module according to a preferred embodiment of the present invention.

FIG. 8 shows the circuit diagram of a light load detection module according to a preferred embodiment of the present invention. As shown in FIG. 8, the circuit includes a pair of amplifiers 801~802, resistors 803~806, a pair of comparators 807~808, a switch 809 and a latch 810.

The pair of amplifiers 801~802 and the resistors 803~806 are used to generate a third threshold voltage $V_{L\_LOADA}$ which is 50% of $V_{RAMPA}$, and a fourth threshold voltage $V_{L\_LOADB}$ which is 50% of $V_{RAMPB}$.

The comparator 807 has a positive input coupled to $V_{RAMPA}$, a negative input coupled to $V_{L\_LOADB}$, and an output for providing a first light load signal $V_{L\_LD1}$, which will be at high logic level when $V_{RAMPA}$ is higher than $V_{L\_LOADB}$, and be at low logic level otherwise.

The comparator 808 has a positive input coupled to $V_{RAMPB}$, a negative input coupled to $V_{L\_LOADA}$, and an output for providing a second light load signal $V_{L\_LD2}$, which will be at high logic level when $V_{RAMPB}$ is higher than $V_{L\_LOADA}$, and be at low logic level otherwise.

The switch 809 has two inputs coupled to $V_{L\_LD1}$ and $V_{L\_LD2}$ respectively, a control input coupled to $V_{sela}$, and an output for generating a light load signal $V_{L\_LD}$ which is alternatively connected to $V_{L\_LD1}$ and $V_{L\_LD2}$ under the control of $V_{sela}$.

The latch 810 has a data input coupled to $V_{L\_LD}$, a clock input coupled to $V_{2nddisch}$, and a state output for providing the second turn-off signal $V_{OFF2}$. The second turn-off signal $V_{OFF2}$ will take on the logic value of $V_{L\_LD}$ at the falling edge of $V_{2nddisch}$, and when $V_{OFF2}$ exhibits high logic level, it means that the discharge off period exceeds the predetermined period which is 50% of previous secondary side discharge end cycle time.

Figure 9:
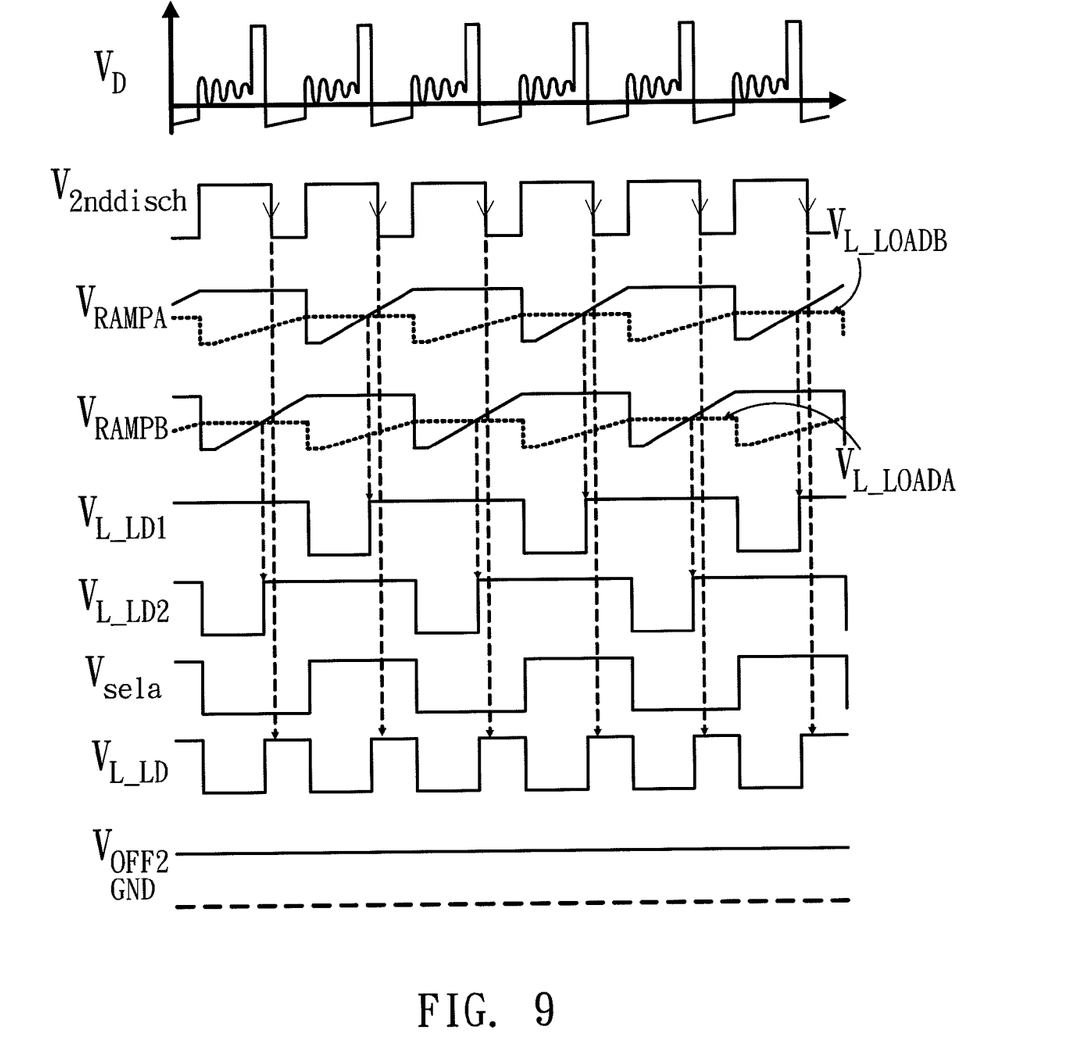
FIG. 9 is the waveforms diagram illustrating the operation of the circuit in FIG. 8 when a light load status is detected.

Please refer to FIG. 9, which shows the waveforms diagram illustrating the operation of the circuit in FIG. 8 when a light load status is detected. As shown in FIG. 9, $V_{RAMPB}$ is higher than $V_{L\_LOADA}$ and $V_{RAMPA}$ is higher than $V_{L\_LOADB}$ at the falling edges of $V_{2nddisch}$, so $V_{L\_LD1}$ and $V_{L\_LD2}$ and thereby $V_{L\_LD}$ are at high logic level at the falling edges of $V_{2nddisch}$, and $V_{OFF2}$ thus remains at high logic level in the light load period shown in FIG. 9.

Through the implementation of the preferred embodiments of the present invention, a switching power converter is enabled to appropriately switch off a secondary side switch when it experiences steep load transitions or light load condition, and thereby prevent possible disasters and/or minimize the power consumption.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A secondary side protection method for a switching power converter, used to turn off a secondary side switch according to a secondary side voltage signal, wherein said secondary side voltage signal has falling edges corresponding to the start instants of secondary side discharge periods, and rising edges corresponding to the end instants of said secondary side discharge periods, said method comprising the steps of:
   measuring the time interval between two adjacent said rising edges repeatedly to derive discharge end cycle times; and
   generating a first turn-off signal to turn off said secondary side switch when the relative difference of two successive said discharge end cycle times exceeds a predetermined percentage.

2. The method according to claim 1, further comprising the steps of:
   measuring the time interval between said rising edge and said falling edge repeatedly to derive discharge off periods; and
   generating a second turn-off signal to turn off said secondary side switch when said discharge off period exceeds a predetermined period.

3. A secondary side protection apparatus for a switching power converter, used to turn off a secondary side switch according to a secondary side voltage signal, wherein said secondary side voltage signal has falling edges corresponding to the start instants of secondary side discharge periods, and rising edges corresponding to the end instants of said secondary side discharge periods, said apparatus comprising:
   a cycle time measuring unit, used for measuring the time interval between two successive said rising edges repeatedly to derive discharge end cycle times; and
   a transient protection module, used for generating a first turn-off signal to turn off said secondary side switch when the relative difference of two successive said discharge end cycle times exceeds a predetermined percentage.

4. The apparatus according to claim 3, further comprising:
   a light load processing module, used for measuring the time interval between said rising edge and said falling edge to derive a discharge off period repeatedly, and generating a second turn-off signal to turn off said secondary side switch when said discharge off period exceeds a predetermined period.

5. The apparatus according to claim 3, wherein said cycle time measuring unit comprises:
   a first comparator for generating a first reset signal according to voltage comparison of a first reference voltage and said secondary side voltage signal;
   a second comparator for generating a first set signal according to voltage comparison of a second reference voltage and said secondary side voltage signal;
   a first latch for generating a secondary side discharge status signal according to said first reset signal and said first set signal; and
   a cycle time sensing circuit, used for measuring the time interval between two successive rising edges of said secondary side discharge status signal repeatedly to derive said discharge end cycle times.

6. The apparatus according to claim 5, wherein said second reference voltage is greater than said first reference voltage.

7. The apparatus according to claim 5, wherein said cycle time sensing circuit comprises:
   a toggling unit for generating a pair of complementary selecting signals according to the level transitions of said secondary side discharge status signal; and
   a pair of integrating circuits for generating a pair of time-interleaved ramp signals according to said pair of complementary selecting signals, wherein said pair of time-interleaved ramp signals both have a basic symbol consisted of a ramp-up portion and a hold portion, and the voltages of said pair of time-interleaved ramp signals in said hold portions represent said discharge end cycle times.

8. The apparatus according to claim 7, wherein said pair of integrating circuits comprise:
   a pair of current sources, used for providing a pair of constant currents under the control of said pair of complementary selecting signals; and
   a pair of capacitors, charged by said pair of constant currents to generate said pair of time-interleaved ramp signals.

9. The apparatus according to claim 8, wherein said transient protection module comprises:
   a third comparator, having a positive input coupled to one of said pair of time-interleaved ramp signals, a negative input coupled to a first ratio of the other one of said pair of time-interleaved ramp signals, and an output for generating an under-low-bound signal, wherein said first ratio is below unity by said predetermined percentage;
   a fourth comparator, having a negative input coupled to one of said pair of time-interleaved ramp signals, a positive input coupled to a second ratio of the other one of said pair of time-interleaved ramp signals, and an output for generating an over-high-bound signal, wherein said second ratio is above unity by said predetermined percentage;
   a NAND gate, used for generating an out-of-bound signal according to said under-low-bound signal and said over-high-bound signal; and
   a second latch, used for generating said first off signal according to said out-of-bound signal under the control of said secondary side discharge status signal.

10. The apparatus according to claim 8, wherein said light load processing module comprises:
- a third comparator, having a positive input coupled to one of said pair of time-interleaved ramp signals, a negative input coupled to a third ratio of the other one of said pair of time-interleaved ramp signals, and an output for generating a first light load signal, wherein said third ratio is smaller than unity;
- a fourth comparator, having a positive input coupled to said the other one of said pair of time-interleaved ramp signals, a negative input coupled to a fourth ratio of said one of said pair of time-interleaved ramp signals, and an output for generating a second light load signal, wherein said fourth ratio is smaller than unity;
- a switch, used for generating a light load signal by alternately selecting said first light load signal and said second light load signal under the control of one of said pair of complementary selecting signals; and
- a second latch, used for generating said second off signal according to said light load signal under the control of said secondary side discharge status signal.

\* \* \* \* \*